US008800923B2

(12) United States Patent
Dock

(10) Patent No.: US 8,800,923 B2
(45) Date of Patent: Aug. 12, 2014

(54) METHOD OF ACTIVATING PROTECTION MEANS FOR PROTECTING AN OCCUPANT OF AN AIRCRAFT, AND AN AIRCRAFT IMPLEMENTING SAID METHOD

(75) Inventor: Laurent Dock, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 219 days.

(21) Appl. No.: 13/229,909

(22) Filed: Sep. 12, 2011

(65) Prior Publication Data

US 2012/0068015 A1 Mar. 22, 2012

(30) Foreign Application Priority Data

Sep. 14, 2010 (FR) ...................................... 10 03652

(51) Int. Cl.
*B64C 1/00* (2006.01)
(52) U.S. Cl.
USPC .......................................................... 244/121
(58) Field of Classification Search
USPC .......................................................... 244/121
See application file for complete search history.

(56) References Cited

U.S. PATENT DOCUMENTS

| 5,556,056 | A | * | 9/1996 | Kalberer et al. | 244/121 |
| 5,610,575 | A | * | 3/1997 | Gioutsos | 340/429 |
| 5,779,264 | A | * | 7/1998 | de Mersseman et al. | 280/735 |
| 5,835,007 | A | * | 11/1998 | Kosiak | 340/436 |
| 5,928,300 | A | * | 7/1999 | Rogers et al. | 701/45 |
| 6,028,505 | A | * | 2/2000 | Drori | 340/426.17 |
| 6,170,864 | B1 | * | 1/2001 | Fujita et al. | 280/735 |
| 6,259,379 | B1 | * | 7/2001 | Paterson et al. | 340/970 |
| 2001/0019089 | A1 | * | 9/2001 | Happ | 244/122 AG |
| 2005/0230545 | A1 | * | 10/2005 | Ayoub | 244/122 A |

FOREIGN PATENT DOCUMENTS

WO  2004059445 A2  7/2004

OTHER PUBLICATIONS

Search Report and Written Opinion; Application No. FR 1003652; dated May 16, 2011.

* cited by examiner

*Primary Examiner* — Tien Dinh
*Assistant Examiner* — Justin Benedik
(74) *Attorney, Agent, or Firm* — Brooks Kushman P.C.

(57) ABSTRACT

A system and method of activating protection means (1) in order to protect the physical integrity of an occupant of an aircraft (10) during an accident is provided. The protection means (1) are activated when, firstly the acceleration of said aircraft (10) along a particular axis (X, Y, Z) of the coordinate system of the aircraft (10) is greater than a first variable threshold, and secondly when the speed variation of the aircraft along said particular axis (X, Y, Z) is greater than a second variable threshold. The first variable threshold and the second variable threshold each vary as a function of the stage of flight of the aircraft (10) in such a manner as to be minimized during predetermined accident-prone stages of flight.

20 Claims, 1 Drawing Sheet

METHOD OF ACTIVATING PROTECTION MEANS FOR PROTECTING AN OCCUPANT OF AN AIRCRAFT, AND AN AIRCRAFT IMPLEMENTING SAID METHOD

CROSS REFERENCE TO RELATED APPLICATIONS

This application claims the benefit of FR 10 03652 filed on Sep. 14, 2010, the disclosure of which is incorporated in its entirety by reference herein.

BACKGROUND OF THE INVENTION (1) Field of the Invention

The present invention relates to a method of activating protection means for protecting an occupant of an aircraft, and to an aircraft implementing the method.

In order to protect an occupant of an aircraft, it is possible to use protection means that are activated by activator means, e.g. a protection bag that is deployed out from a housing by deployment means, a belt co-operating with blocking means, or indeed fusible means of a structure for breaking by dedicated means. The activator means may in particular be pyrotechnic means.

It should be observed that the term "activate protection means" should be understood as an operation causing the protection means to be active. For example, deployment means activate a protection bag by inflating it, and blocking means activate a safety belt by blocking it in a position.

Safety systems are known that seek to inflate a protection bag in the event of an accident in order to protect at least one occupant of the aircraft. The protection bag is inflated by inflation means to occupy a position between the occupant of the aircraft and a wall of the aircraft so as to avoid contact between said occupant and said wall during such an accident.

An inflatable protection bag is commonly referred to as an "airbag".

(2) Description of Related Art

Document U.S. Pat. No. 5,556,056 describes an aircraft safety system having at least one inflatable protection bag contained in a storage space. That safety system is provided with means for inflating the protection bag. The inflation means activate the protection bag as a function of the acceleration of the aircraft in order to deploy the protection bag out from the storage space.

According to document US 2001/019089, three orthogonal accelerometers are used.

Similarly, document U.S. Pat. No. 5,928,300 suggests using three accelerometers measuring the acceleration of the aircraft along three respective directions. A microprocessor deduces therefrom a longitudinal acceleration along a longitudinal direction of the aircraft, a transverse acceleration along a transverse direction of the aircraft, and an elevation acceleration along an elevation direction of the aircraft.

Furthermore, according to that document U.S. Pat. No. 5,928,300, the microprocessor initially determines whether at least one of said longitudinal, transverse, and elevation accelerations exceeds a first predetermined threshold.

When any one of said longitudinal, transverse, and elevation accelerations exceeds a first predetermined threshold, the microprocessor determines the speed variation of the aircraft in the direction of the excessive acceleration. The microprocessor requires the inflatable bags to be inflated if said variation exceeds a second predetermined threshold.

Thus, the microprocessor causes the inflatable bags to be inflated when:

- the longitudinal acceleration exceeds a first longitudinal threshold and when the variation of the longitudinal speed of the aircraft along the longitudinal direction exceeds a second longitudinal threshold;
- the transverse acceleration exceeds a first transverse threshold and when the variation of the transverse speed of the aircraft along the transverse direction exceeds a second transverse threshold; or
- the elevation acceleration exceeds a first elevation threshold and when the variation of the elevation speed of the aircraft along the elevation direction exceeds a second elevation threshold.

In addition, it can be understood that untimely deployment of a protection bag should be avoided.

Document WO 2004/059445A2 is also known.

SUMMARY OF THE INVENTION

An object of the present invention is thus to propose a method and an aircraft that enable untimely activation of protection means of an aircraft to be avoided, i.e. enabling activation of the protection means to be avoided other than during an accident.

According to the invention, a method of activating protection means via activator means in order to protect the physical integrity of an occupant of an aircraft during an accident, the aircraft being associated with a rectangular coordinate system having a longitudinal axis, a transverse axis, and an elevation axis, is remarkable in particular in that it comprises the following steps:

determining a longitudinal acceleration of the aircraft along the longitudinal axis, a transverse acceleration of the aircraft along the transverse axis, and an elevation acceleration of the aircraft along the elevation axis;

determining a longitudinal variation of a longitudinal speed of the aircraft along the longitudinal axis, a transverse variation of a transverse speed of the aircraft along the transverse axis, and an elevation variation of an elevation speed of the aircraft along the elevation axis, each speed variation being established over a predetermined time window, e.g. of 0.1 seconds; and activating the protection means when, firstly the acceleration of the aircraft along a particular axis of the system of axes of the aircraft is greater than a first variable threshold, and secondly the speed variation of the aircraft along the particular axis is greater than a second variable threshold, the first and second variable thresholds each varying as a function of the stage of flight of the aircraft so as to be minimized during predetermined accident-prone stages of flight.

Thus, the protection means are activated when any one of the following three conditions is satisfied:

- the longitudinal acceleration of the aircraft along the longitudinal axis is greater than a first variable longitudinal threshold and the longitudinal variation of the speed of the aircraft along the longitudinal axis is greater than a second variable longitudinal threshold;
- the transverse acceleration of the aircraft along the transverse axis is greater than a first variable transverse threshold and the transverse variation of the speed of the aircraft along the transverse axis is greater than a second variable transverse threshold; and
- the elevation acceleration of the aircraft along the acceleration axis is greater than a first variable elevation threshold and the elevation variation of the speed of the aircraft along the elevation axis is greater than a second variable elevation threshold.

It should be observed that the term "stage of flight" is used to mean any of the situations in which the aircraft might be found, where such stages of "flight" in fact include stages during which the aircraft is on the ground and not flying, e.g. while the aircraft is taking off.

Thus, thresholds for triggering the protection means are used that vary as a function of the operational state of the aircraft in order to minimize any risk of untimely triggering, while facilitating activation of the protection means prior to an accident.

By way of example, the protection means may be an inflatable protection bag, known as an "airbag". Similarly, the protection means may for example be a belt co-operating with active blocking means, or indeed fusible means for breaking a structure using dedicated means. The activation means may thus be pyrotechnic means.

It should be recalled that the term "activating the protection means" designates an operation making the protection means active, i.e. enabling the protection means to protect at least one occupant of the aircraft.

This method may possess one or more of the following characteristics.

In a first aspect, activation of the protection means is prevented by default and said activation of the protection means is authorized during said accident-prone stages of flight.

For example, activation of the protection means is authorized during said accident-prone stages of flight by setting at least two threshold levels, a first level comprising a first medium threshold and a second medium threshold during stages of flight that are not very accident-prone, and a second level comprising a first low threshold and a second low threshold during stages of flight that are very accident-prone.

For example, the first medium threshold and the first low threshold are 8 g and 5 g for longitudinal acceleration, 6 g and 4 g for transverse acceleration, and 8 g and 5 g for elevation acceleration, where "g" represents acceleration due to gravity.

Similarly, the second medium threshold and the second low threshold are over a moving 0.1 second window for example 2.5 meters per second ($m.s^{-1}$) and 1.5 $m.s^{-1}$ for longitudinal variation of the longitudinal speed of the aircraft, 1 $m.s^{-1}$ and 0.5 $m.s^{-1}$ for transverse variation of the transverse speed of the aircraft, and 4 $m.s^{-1}$ and 2 $m.s^{-1}$ for elevation variation of the speed of elevation of the aircraft.

Under such circumstances, the first variable threshold and the second variable threshold are set respectively to a low first threshold value and a low second threshold value when emergency buoyancy means are activated. Activation of buoyancy means is an indicator that a potentially dangerous impact is imminent, so the criteria required for activating the protection means are lowered.

Likewise, the first variable threshold and the second variable threshold are set respectively to a first low threshold value and to a second low threshold value when the aircraft possesses firstly an aircraft elevation speed along the elevation axis that is greater than a predetermined rate of descent, and secondly a height relative to the ground over which it is flying that is less than a predetermined height.

Furthermore, activation of the protection means may be prevented during given stages of flight either by giving the first variable threshold a first maximum value that the aircraft cannot reach, or by giving the second variable threshold a second maximum value that the aircraft cannot reach, or by giving the first variable threshold said first maximum value and by giving the second variable threshold said second maximum value.

Activation of the protection means may also be prevented by switching off the electrical power supply to the activator means of said protection means, for example.

In addition, it is not essential to authorize activation of the protection means when the aircraft is parked on a parking space.

In order to avoid untimely triggering in an aircraft that is propelled by a power plant having at least one engine, activation of the protection means is prevented when means for controlling the engine are voluntarily switched off on the ground.

Similarly, activation of the protection means is prevented when an electrical system of the aircraft has been switched off for a first predetermined duration. The first predetermined duration serves to guarantee that the protection means are activated during an accident, even if the electrical system of the aircraft is instantaneously interrupted by the accident.

According to an aspect of the invention, when the aircraft is landing on the ground, activation of the protection means is prevented after a second predetermined duration following touchdown of the aircraft on the ground. The second predetermined duration serves to deactivate the protection means solely after a duration corresponding to a crash has elapsed, e.g. 5 seconds.

In another aspect, in an aircraft having a rotary wing including at least one rotor rotating at a speed of rotation, activation of the protection means is prevented when said speed of rotation is less than a predetermined minimum speed of rotation, the nominal speed of rotation minus twenty percent, for example.

It is then considered that the aircraft is standing on the ground, e.g. during a stage of starting or stopping the power plant.

In addition, activation of the protection means is prevented when the speed of rotation is less than a predetermined minimum speed of rotation and the aircraft has been on the ground for a predetermined third duration.

It is found that the speed of rotation of the rotor may be reduced considerably as a result of a blade of the rotor hitting the ground, where such an impact occurs because of an accident. Putting the third predetermined duration into place guarantees that such an accident is taken into consideration.

In addition, activation of the protection means as a result of the speed of rotation of the rotary wing being less than a minimum speed of rotation is no longer prevented by authorizing the activation of the protection means if at least one engine driving the rotary wing has failed and the aircraft has not been on the ground for longer than a fourth predetermined duration. Under such circumstances, the state of the power plant is monitored prior to preventing activation of the protection means.

In addition to a method, the invention provides an aircraft implementing the method, the aircraft being associated with a rectangular coordinate system having a longitudinal axis, a transverse axis, and an elevation axis. The aircraft has a system for protecting an occupant, which system includes protection means and activator means for activating the protection means in order to activate the protection means such as a protection bag arranged in a housing and means for deploying said protection bag out from said housing. The aircraft possesses a longitudinal accelerometer for determining acceleration of the aircraft along the longitudinal axis, a transverse accelerometer for determining acceleration of the aircraft along the transverse axis, and an elevation accelerometer for determining acceleration of the aircraft along the elevation axis, the aircraft having control means for controlling the activator means and provided with processor means suitable for determining a longitudinal variation of a longitudinal speed of the aircraft along the longitudinal axis, a transverse variation of a transverse speed of the aircraft along the transverse axis, and an elevation variation of an elevation speed of the aircraft along the elevation axis.

Under such circumstances, the control means include a memory containing, for each of the accelerations and each of the speed variations, a plurality of possible values respectively for a first variable threshold and for a second variable threshold, each value being associated with at least one stage of flight, the processor unit using the value of the first variable threshold and the value of the second variable threshold corresponding to the current stage of flight of the aircraft in order to determine whether the protection means should be activated.

Furthermore, the aircraft may include at least one member selected from a list comprising at least one of the following elements:

- a first sensor present on landing gear to inform the control means whether the aircraft is resting on the ground;
- a control member enabling an operator to inform the control means whether the aircraft is resting on the ground;
- an emergency battery enabling the protection system to be powered electrically;
- detector means for detecting activation of emergency buoyancy means for an aircraft that has ditched;
- a second sensor sending information to the control means relating to the speed of rotation of a rotary wing of the aircraft;
- analyzer means for analyzing the operation of at least one engine contributing to propelling the aircraft;
- means for switching on said engine and connected to the control means;
- means for determining the height of the aircraft relative to the ground; and
- means for determining the rate of descent of the aircraft.

Furthermore, said protection means may comprise a protection bag and said activator means may comprise deployment means, the deployment means activating the protection bag by deploying it out from a housing.

BRIEF DESCRIPTION OF THE DRAWINGS

The invention and its advantages appear in greater detail from the context of the following description of embodiments given by way of illustration with reference to the accompanying figures, in which:

FIG. 1 shows a method of deploying a protective bag for protecting an occupant of an aircraft during an accident.

DETAILED DESCRIPTION OF THE PREFERRED EMBODIMENTS

Conventionally, in an aircraft, an orthogonal coordinate system is defined that is tied to the aircraft, said system comprising a longitudinal axis along which the aircraft extends from a nose to a tail, a transverse axis along which the aircraft extends from a left side to a right side, and an elevation axis along which the aircraft extends from landing gear to a top portion.

In accordance with the method, during a first step E1, there are determined: a longitudinal acceleration of the aircraft along the longitudinal axis; a transverse acceleration of the aircraft along the transverse axis; and an elevation acceleration of the aircraft along the elevation axis.

By integrating these accelerations during a second step E2, there are determined: a longitudinal variation of a longitudinal speed of the acceleration along the longitudinal axis; a transverse variation of a transverse speed of the aircraft along the transverse axis: and an elevation variation of an elevation speed of the aircraft along the elevation axis.

Then, during a third step E3, protection means for at least one occupant of the aircraft are activated when firstly the acceleration of the aircraft along a particular axis of the coordinate system of the aircraft is greater than a first variable threshold and secondly the variation of the speed of the aircraft along said particular axis is greater than a second variable threshold, the first variable threshold and the second variable threshold each varying as a function of the stage of flight of the aircraft in such a manner as to be minimized during predetermined stages of flight that are accident-prone, and possibly even increased compared with medium values under certain conditions that are guaranteed to be "crash-free" or not very accident-prone, but in which the risk to be avoided is that of unwanted triggering.

Figure 1:
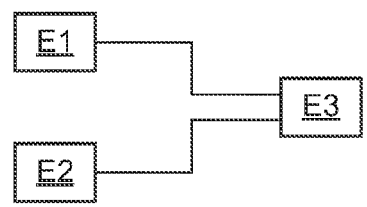
FIG. 1 is a diagram illustrating the method of the invention.
Figure 2:
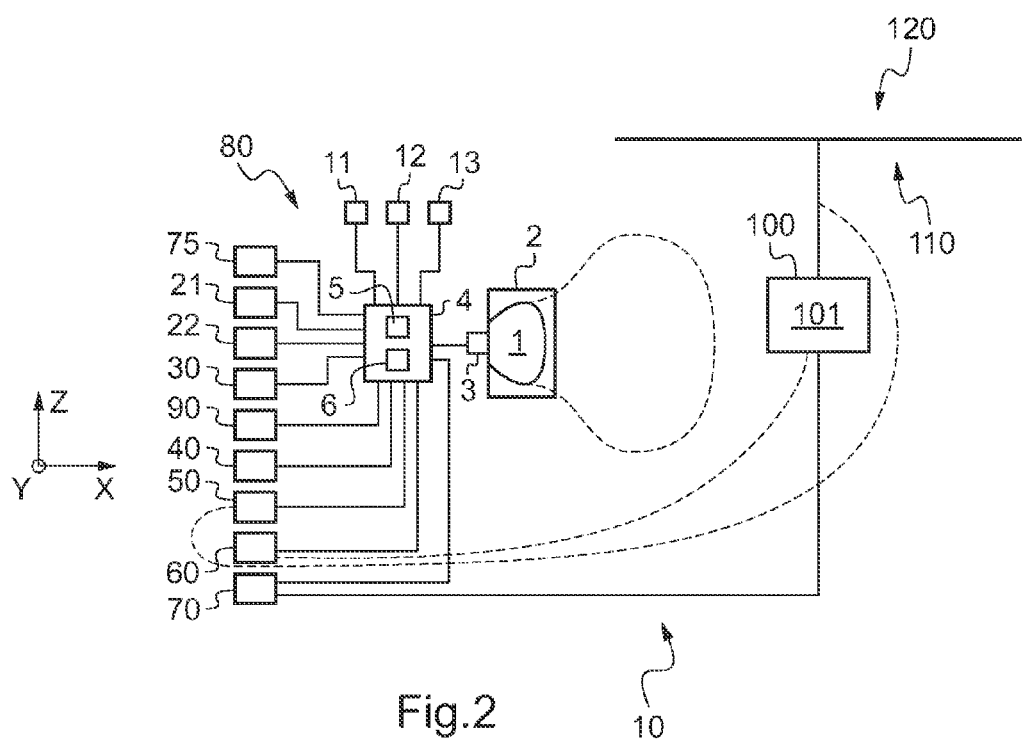
FIG. 2 is a diagram illustrating the method of the invention.

FIG. 2 shows an aircraft 10 implementing the method, FIG. 2 also showing additional characteristics of the method.

The aircraft 10 comprises an airframe associated with a coordinate system having a longitudinal axis X, a transverse axis Y, and an elevation axis Z, which axes are mutually orthogonal. The airframe extends from a front end towards a rear end along the longitudinal axis X, from a left side to a right side along the transverse axis Y, and from landing gear towards a top portion containing the rotary wing 110, along an elevation axis Z, sometimes referred to as a vertical axis.

The axis X is said to be longitudinal insofar as the aircraft extends along this longitudinal axis.

The axis Y is said to be transverse. The term "width" relates to a transverse dimension of the device along said transverse axis.

Finally, the axis Z is said to be the "elevation" axis and it corresponds to the height dimensions of the structures described.

Reference may be made to the literature to obtain more information about such a coordinate system for an aircraft.

Furthermore, the aircraft 10 includes a power plant 100 arranged in the airframe, the power plant 100 being provided with at least one engine 101 in order to enable the aircraft to move. On a rotorcraft, the power plant 100 imparts rotary drive to a rotary wing 110 comprising at least one lift rotor 120, and in particular a lift and propulsion rotor in a helicopter.

In order to protect the occupants of the aircraft 10, the aircraft 10 includes a protection system 80 provided with at least one protection means 1 arranged in a housing 2, specifically a protection bag in the embodiment described.

The protection system 80 is then fitted with activator means suitable for activating the protection means 1, means for deploying a protection bag out from a housing in the embodiment described so as to avoid contact between an occupant of the aircraft 10 and a wall of said aircraft 10. By way of example, the protection means 1 may be an inflatable airbag, the deployment means being a generator for inflating the protection bag, where appropriate.

Under such circumstances, the protection system is provided with control means 4 instructing the activator means 3 to activate the protection means 1, the activator means 3 deploying the protection bag 1 at the required moment in the example illustrating the invention. By way of example, the control means 4 possess a processor unit 5, e.g. of the microprocessor type, and a memory 6. The memory and the processor unit may be component parts of calculation means.

The control means 4 and the activator means 3 may constitute a single element.

Furthermore, the protection system 80 includes means for determining the acceleration of the aircraft 10 along three axes of the coordinate system of the aircraft 10. Consequently, the protection system 80 is provided with:

a longitudinal accelerometer 11 connected to the control means 4 to transmit thereto information concerning the acceleration of the aircraft along said longitudinal axis X, the longitudinal accelerometer 11 being arranged on said longitudinal axis X, for example;

a transverse accelerometer 12, connected to the control means 4 in order to transmit thereto information relating to the acceleration of the aircraft along said transverse axis Y, the transverse accelerometer 12 being arranged along said transverse axis Y, for example; and an elevation accelerometer 13 connected to the control means 4 to transmit thereto information relating to acceleration of the aircraft along said elevation axis Z, said elevation accelerometer 13 being arranged along said elevation axis Z, for example.

By means of the longitudinal, transverse, and elevation accelerometers 11, 12, and 13, the processor unit 5 determines the longitudinal acceleration of the aircraft along the longitudinal axis X, the transverse acceleration of the aircraft along the transverse axis Y, and the elevation acceleration of the aircraft along the elevation axis Z. These longitudinal, transverse, and elevation accelerations may be determined directly from electrical signals coming from accelerometers, or after mathematical processing as a function of the orientations of the accelerometers, as described in certain works in the state of the art.

Furthermore, by integrating these accelerations, the processor unit 5 determines a longitudinal speed of the aircraft along the longitudinal axis X, a transverse speed of the aircraft along the transverse axis Y, and an elevation speed of the aircraft along the elevation axis Z. Under such circumstances, the processor unit determines a longitudinal variation of the longitudinal speed over a given time interval, a transverse variation of the transverse speed, and an elevation variation of the elevation speed over said given time interval.

Furthermore, the memory 6 contains, for each of said accelerations of the aircraft and for each of said above-mentioned speed variations, a plurality of possible values respectively for a first variable threshold and for a second variable threshold, each value being associated with at least one stage of flight.

The control means 4 then use the corresponding values of the first variable threshold for each determined acceleration, and for each determined speed variation it uses the corresponding values of the second variable threshold corresponding to the current stage of flight of the aircraft 10 so that when necessary it can order the activator means 3 to activate the protection means 1 in order to protect at least one occupant of the aircraft, in accordance with the applied method.

Advantageously, the processor unit prevents activation of the protection means 1 by default, and authorizes activation of the protection means 1 only during stages of flight in which an accident might occur.

In order to inhibit activation of the protection means 1, it suffices for example to set the values of the first thresholds and of the second thresholds for each determined acceleration and for each determined speed variation at maximum values that are very high relating to predefined first maximal thresholds and second maximal thresholds, where the aircraft is not capable of reaching these maximum values, for example. Under such circumstances, the accelerations and the speed variations monitored by the processor unit 5 will never reach these first and second maximum thresholds. The processor unit 5 then runs no risk of triggering the deployment of a protection bag 1, for example.

It should be observed that activation of the protection means 1 may also be prevented by switching off the electrical power supply to the activator means 3 for activating the protection means, or indeed by means of the control means 4 appropriately controlling the activator means 3. For example, the control means 4 may open a switch located upstream from the activator means 3 in order to interrupt the connecting going from the control means 4 to the activator means 3.

Furthermore, in order to match the sensitivity of the protection system 80 to the current stage of flight, it is possible to provide different levels of sensitivity for authorizing activation of the protection means.

For example, a first level comprises one first medium threshold and one second medium threshold per type of acceleration and per type of speed variation processed during stages of flight that are not very accident-prone, whereas a second level comprises a respective first low threshold and a respective second low threshold for each determined acceleration and for each determined speed variation during stages of flight that are very accident-prone.

Thus, at least three levels of sensitivity may be programmed in the memory 6, a first level and a second level that enable the protection means to be activated, and an additional level that prevents activation of the protection means.

Naturally, other levels could be envisaged, if necessary.

In addition, the control means 4 assume that the variable first and second thresholds for each determined acceleration and for each determined speed variation are equal respectively to a first low threshold and to a second low threshold for each determined acceleration and each determined speed variation when emergency buoyancy means of the aircraft are activated.

Consequently, the protection system 80 includes detector means 40 for detecting activation of emergency buoyancy means, the detector means 40 being connected to the control means 4. By way of example, the detector means 40 may comprise the means for triggering the emergency buoyancy means.

Similarly, the control means 4 assume that the first and second variable thresholds for each determined acceleration and each determined speed variation are equal respectively to the first low threshold and to the second low threshold for each determined acceleration and each determined speed variation when the aircraft is approaching the ground at a high rate of descent, which will give rise to an emergency landing in the short term.

Thus, the protection system 80 includes determination means 90 for determining the height of the aircraft 10 relative to the ground, which determination means are connected to the control means 4, and the system also includes means 75 for measuring the rate of descent. Consequently, when the aircraft 10 possesses firstly an elevation speed along the elevation axis Z that is greater than a predetermined rate of descent and secondly a height relative to the ground above which it is flying that is less than a predetermined height, e.g. 30 meters, then the control means 4 makes use of the first and second low thresholds in order to determine whether the protection means 1 should be activated.

Conversely, when the aircraft is on the ground, it is assumed that the aircraft is not in an accident-prone stage of flight.

Thus, by default, the control means 4 assume that the first and second variable thresholds for each determined acceleration and for each determined speed variation are equal respectively to first and second high thresholds for each determined acceleration and for each determined speed variation in order to prevent the protection means being activated.

In a first implementation, in order to determine whether the aircraft is on the ground, the protection system 80 include a first sensor 21 connected to the control means 4. The first sensor 21 may be a presser sensor arranged on a shock absorber of the landing gear, the control means determining whether the aircraft 10 is resting on the ground as a function of the measured pressure.

Nevertheless, this parameter must not inhibit the system at the moment when the aircraft landing gear touches the ground during a crash. Under such circumstances, the high thresholds should be taken into consideration only after the sensor 21 has detected the ground for a defined duration, e.g. one second.

In a second implementation, compatible with the first implementation, the protection system 80 includes a control member 22, such as a knob operable by an operator in order to inform the control means 4 that the aircraft 10 is resting on the ground.

Consequently, once the control means 4 receive an indication informing it that the aircraft 10 has taken off, the control means 4 make use of appropriate first and second thresholds in order to authorize activation of the protection means, where appropriate. Furthermore, the control means 4 reestablish the electrical connection with the activator means, where appropriate.

In addition, in order to avoid activating the protection means on the ground, e.g. during maintenance actions, the control means may prevent activation of the protection means 1 when an electrical system of the aircraft has been switched off for a predetermined first duration.

In the absence of electrical power supply, the control means 4 are not in a position to trigger activation of the protection means via the activator means.

Nevertheless, the electrical power supply may be interrupted as the result of an accident. Under such circumstances, the protection system may include an emergency battery 30 enabling the protection system 80 to be powered during said first duration.

Nevertheless, it is useful to determine whether the aircraft is on the ground after an accident.

In a variant, the control means 4 prevent activation of the protection means 1 when means 70 for switching on an engine 101 of the aircraft are voluntarily switched off on the ground. By way of example, the means 70 may comprise a switch enabling the engine(s) of the aircraft to be started.

If the engine(s) is/are not put into operation by an operator, the control means can deduce therefrom that the aircraft is voluntarily stationary on the ground, prior to takeoff or after landing. Switching off the engine thus deactivates the protection system, thereby making it possible to avoid transient phenomena when switching off the engine(s).

In addition, when the aircraft 10 is landing on the ground, activation of the protection means is prevented after a second predetermined duration after the aircraft 10 has touched down on the ground.

It is possible for vibration under those circumstances to trigger deployment of the protection bag. Advantageously, the electrical power supply of the protection system 80 is switched off in order to deactivate the protection system 80, or at least the connection between the control means 4 and the activator means 3 is interrupted.

In another aspect, in an aircraft having a rotary wing 110 including at least one rotor 120 that rotates at a speed of rotation, activation of the protection means 1 is prevented whenever the speed of rotation is less than a predetermined minimum speed of rotation. This is put into place in order to ensure that vibration from the rotor does not trigger deployment of a protection bag, for example.

Consequently, the protection system includes a second sensor 50 sending information to the control means 4 relating to the speed of rotation of a rotary wing 110 of the aircraft 10. Reference may be made to the literature in order to obtain information about such a second sensor.

Nevertheless, a slow speed of rotation of the rotor may be the result of a blade hitting the ground during an accident. Under such circumstances, the protection system 80 may serve to prevent activation of the protection means 1 when the speed of rotation is less than a predetermined minimum speed of rotation and the aircraft has been on the ground for a predetermined third duration. In other words there is a time delay before the protection system 80 is de-activated.

Similarly, a slow speed of rotation of the rotor may be the result of an engine failure in flight. Under such circumstances, prevention of activation of the protection means is avoided if at least one engine 101 for driving said rotary wing 110 has failed and the aircraft has not been on the ground for longer than a fourth predetermined duration.

The protection system 80 is then provided with analyzer means 60 for analyzing the operation of at least one engine 101 contributing to propelling the aircraft 10. Reference may be made to the literature to obtain information about such analyzer means 60.

Naturally, the present invention may be subjected to numerous variations as to its implementation. Although several embodiments are described above, it will readily be understood that it is not conceivable to identify exhaustively all possible implementations. It is naturally possible to envisage replacing any of the means described by equivalent means without going beyond the ambit of the present invention.

What is claimed is:

1. A method of activating protection means via activator means in order to protect the physical integrity of an occupant of an aircraft during an accident, the aircraft being associated with a rectangular coordinate system comprising a longitudinal axis (X), a transverse axis (Y), and an elevation axis (Z), the method comprising the following steps:

determining a longitudinal acceleration of the aircraft along said longitudinal axis (X), a transverse acceleration of the aircraft along said transverse axis (Y), and an elevation acceleration of the aircraft along said elevation axis (Z);

determining a longitudinal variation of a longitudinal speed of the aircraft along said longitudinal axis (X), a transverse variation of a transverse speed of the aircraft along said transverse axis (Y), and an elevation variation of an elevation speed of the aircraft along said elevation axis (Z); and activating said protection means when, firstly the acceleration of said aircraft along a particular axis being one of the longitudinal, transverse and elevation axes is greater than a first variable threshold, and secondly the speed variation of the aircraft along said particular axis being the same one of the longitudinal, transverse and elevation axes is greater than a second variable threshold, wherein the first and second variable thresholds each vary based on a stage of flight of the aircraft so as to be minimized during predetermined accident-prone stages of flight.

2. The method according to claim 1, wherein activation of the protection means is prevented by default and said activation is authorized during said accident-prone stages of flight.

3. The method according to claim 1, wherein the first and second variable thresholds each include at least two threshold levels, a first threshold level during stages of flight that are not very accident-prone, and a second low threshold level during stages of flight that are very accident-prone, the second level being a lower value than the first level.

4. The method according to claim 3, wherein the first variable threshold and the second variable threshold are set respectively to the low first threshold value and the low second threshold value when emergency buoyancy means are activated.

5. The method according to claim 3, wherein the first variable threshold and the second variable threshold are set respectively to the low first threshold value and to the low second threshold value when the stage of flight includes:
 an aircraft elevation speed along said elevation axis that is greater than a predetermined rate of descent, and
 a height relative to the ground over which the aircraft is flying that is less than a predetermined height.

6. The method according to claim 1, wherein activation of the protection means is prevented during the stage of flight either by giving the first variable threshold a first maximum value that the aircraft cannot reach, or by giving the second variable threshold a second maximum value that the aircraft cannot reach, or by giving the first variable threshold said first maximum value and by giving the second variable threshold said second maximum value.

7. The method according to claim 1, wherein in an aircraft that is propelled by a power plant having at least one engine, activation of the protection means is prevented when means for controlling the engine are voluntarily switched off on the ground.

8. The method according to claim 1, wherein activation of the protection means is prevented during the stage of flight when an electrical system of the aircraft has been switched off for a first predetermined duration.

9. The method according to claim 1, wherein during the stage of flight when the aircraft is landing on the ground, activation of the protection means is prevented after a second predetermined duration following touchdown of the aircraft on the ground.

10. The method according to claim 1, wherein the aircraft includes a rotary wing having at least one rotor rotating at a speed of rotation, wherein activation of the protection means is prevented during the stage of flight when said speed of rotation is less than a predetermined minimum speed of rotation.

11. The method according to claim 10, wherein activation of the protection means is prevented during the stage of flight when said speed of rotation is less than the predetermined minimum speed of rotation and the aircraft has been on the ground for a predetermined third duration.

12. The method according to claim 10, wherein activation of the protection means is no longer prevented by authorizing said activation of the protection means if at least one engine driving said rotary wing has failed and the aircraft has not been on the ground for longer than a fourth predetermined duration.

13. An aircraft suitable for implementing the method according to claim 1, the aircraft comprising:
 a system for protecting an occupant, which system includes protection means and activator means for activating the protection means;
 a longitudinal accelerometer for determining the acceleration of the aircraft along said longitudinal axis;
 a transverse accelerometer for determining the acceleration of the aircraft along said transverse axis;
 an elevation accelerometer for determining the acceleration of the aircraft along said elevation axis;
 control means for controlling said activator means and provided with processor means suitable for determining the longitudinal variation of the longitudinal speed of the aircraft along said longitudinal axis (X), a transverse variation of a transverse speed of the aircraft along said transverse axis (Y), and an elevation variation of an elevation speed of the aircraft along said elevation axis (Z), wherein said control means include a memory containing, for each of said accelerations and each of said speed variations, a plurality of possible values respectively for a first variable threshold and for a second variable threshold, each value being associated with at least one stage of flight, said processor unit using the value of the first variable threshold and the value of the second variable threshold corresponding to the current stage of flight of the aircraft in order to determine whether the protection means should be deployed.

14. The aircraft according to claim 13, including at least one member selected from a list comprising at least one of the following elements:
 a first sensor present on landing gear to inform the control means whether the aircraft is resting on the ground;
 a control member enabling an operator to inform the control means whether the aircraft is resting on the ground;
 an emergency battery enabling the protection system to be powered electrically;
 detector means for detecting activation of emergency buoyancy means;
 a second sensor sending information to the control means relating to the speed of rotation of a rotary wing of the aircraft;
 analyzer means for analyzing the operation of at least one engine contributing to propelling the aircraft;
 means for switching on said engine and connected to the control means;
 means for determining the height of the aircraft relative to the ground; and
 means for determining the rate of descent of the aircraft.

15. The aircraft according to claim 13, wherein said protection means comprise an air bag and said activator means comprise deployment means, the deployment means activating the protection bag by deploying it out from a housing.

16. A method of activating a protection device in an aircraft, the method comprising:
 setting a first variable threshold based on an aircraft acceleration along a plurality of directions;
 setting a second variable threshold based on an aircraft speed variation along the plurality of directions; and
 activating the protection device when the aircraft acceleration is greater than the first variable threshold along one of the plurality of directions and the aircraft speed variation is greater than the second variable threshold along the same one of the plurality of directions,
 wherein the first and second variable thresholds vary based on a stage of flight of the aircraft.

17. The method according to claim 16, wherein each of the first and second variable thresholds includes at least two levels, corresponding to a first and second stage of flight, wherein the first stage of flight is more accident-prone than the second stage of flight, the method further comprising setting the first level to a lower value than the second level.

18. The method according to claim 17, wherein the first stage of flight being more accident-prone includes when an emergency buoyancy device is activated.

19. The method according to claim 17, wherein the first stage of flight being more accident-prone includes when:
- the aircraft speed variation along an elevation axis that is greater than a predetermined rate of descent, and
- a height relative to the ground over which the aircraft is flying that is less than a predetermined height.

20. The method according to claim 16, the aircraft including a rotary wing having at least one rotor, the method further comprising preventing the protection device from actuation during the stage of flight when a speed of rotation of the at least one rotor is less than a predetermined minimum speed of rotation.

* * * * *